United States Patent
Miyatake et al.

(10) Patent No.: US 7,532,398 B2
(45) Date of Patent: May 12, 2009

(54) LIGHT PIPE AND POLARIZED-LIGHT SOURCE

(75) Inventors: Minoru Miyatake, Osaka (JP); Takafumi Sakuramoto, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 11/412,996

(22) Filed: Apr. 28, 2006

(65) Prior Publication Data

US 2007/0014007 A1   Jan. 18, 2007

Related U.S. Application Data

(62) Division of application No. 10/872,460, filed on Jun. 22, 2004, which is a division of application No. 09/569,024, filed on May 11, 2000, now Pat. No. 6,952,310.

(30) Foreign Application Priority Data

| May 12, 1999 | (JP) | ............... P. 11-131429 |
| May 12, 1999 | (JP) | ............... P. 11-131430 |
| May 19, 1999 | (JP) | ............... P. 11-138102 |
| Jun. 14, 1999 | (JP) | ............... P. 11-166727 |
| Jun. 21, 1999 | (JP) | ............... P. 11-174368 |
| Jul. 12, 1999 | (JP) | ............... P. 11-197083 |

(51) Int. Cl.
  *G02B 5/30* (2006.01)
  *F21V 7/04* (2006.01)

(52) U.S. Cl. .................. 359/500; 359/599; 362/19; 362/558; 362/619; 362/623

(58) Field of Classification Search ........... 359/494, 359/500, 599; 362/19, 558, 560, 615, 617, 362/619, 624, 627, 629; 349/64, 67
See application file for complete search history.

(56) References Cited

U.S. PATENT DOCUMENTS

| 2,123,902 A | 7/1938 | Land |
| 2,158,130 A | 5/1939 | Land |

(Continued)

FOREIGN PATENT DOCUMENTS

EP   0 770 818   5/1997

(Continued)

OTHER PUBLICATIONS

EP Search Report for EP 00 11 0072 completed 0/May 2000.

*Primary Examiner*—Ricky D Shafer
(74) *Attorney, Agent, or Firm*—Sughrue Mion, PLLC

(57) ABSTRACT

A light pipe is obtained by laminating on one or both surfaces of a light-transmitting resin plate a polarized-light scattering plate having fine birefringent domains dispersed therein and hence showing anisotropy in scattering. The polarized-light scattering plate comprises a transparent film having fine domains dispersed therein comprising a liquid crystal polymer which exhibits nematic at temperatures lower than the glass transition temperature of the polymer constituting matrix of the transparent film and has a glass transition temperature of 50° C. or higher. The light pipe as a laminate may further comprise a specular reflection layer, a polarization-retaining lens and a light diffusion layer laminated thereon. The light pipe may further comprise a light source mounted at least on one side face thereof to provide a planar polarized-light source.

11 Claims, 3 Drawing Sheets

U.S. PATENT DOCUMENTS

| | | | |
|---|---|---|---|
| 3,680,950 | A | 8/1972 | Haas et al. |
| 4,688,900 | A | 8/1987 | Doane et al. |
| 5,048,932 | A | 9/1991 | Yamamoto et al. |
| 5,204,763 | A | 4/1993 | Hikmet |
| 5,331,446 | A | 7/1994 | Hirai et al. |
| 5,729,311 | A * | 3/1998 | Broer et al. ............... 349/65 |
| 5,751,388 | A | 5/1998 | Larson |
| 5,783,120 | A | 7/1998 | Ouderkirk et al. |
| 5,808,709 | A * | 9/1998 | Davis et al. ............... 349/65 |
| 5,825,444 | A | 10/1998 | Broer et al. |
| 5,825,543 | A | 10/1998 | Ouderkirk et al. |
| 5,856,855 | A | 1/1999 | Mol et al. |
| 5,899,551 | A | 5/1999 | Neijzen et al. |
| 5,940,211 | A | 8/1999 | Hikmet et al. |
| 5,955,837 | A | 9/1999 | Horikx et al. |
| 5,995,183 | A | 11/1999 | Tsuyoshi |
| 6,104,455 | A * | 8/2000 | Kashima ............... 349/65 |
| 6,111,696 | A | 8/2000 | Allen et al. |
| 6,175,399 | B1 * | 1/2001 | Mitsui et al. ............. 349/113 |
| 6,236,439 | B1 * | 5/2001 | Saiki et al. ............. 349/117 |
| 6,239,907 | B1 | 5/2001 | Allen et al. |
| 6,256,146 | B1 | 7/2001 | Merrill et al. |
| 6,310,671 | B1 | 10/2001 | Larson |
| 6,361,838 | B1 | 3/2002 | Miyatake et al. |
| 6,369,945 | B1 | 4/2002 | Sakuramoto et al. |
| 6,392,802 | B2 | 5/2002 | Miyatake et al. |
| 6,515,785 | B1 | 2/2003 | Cobb et al. |
| 6,665,028 | B2 | 12/2003 | Nakanishi et al. |
| 6,683,717 | B1 | 1/2004 | Miyatake et al. |
| 6,706,339 | B1 | 3/2004 | Miyatake et al. |
| 6,734,932 | B2 | 5/2004 | Nakanishi et al. |
| 6,850,295 | B1 | 2/2005 | Miyatake et al. |
| 6,905,220 | B2 * | 6/2005 | Wortman et al. ............. 362/627 |
| 6,947,105 | B2 | 9/2005 | Miyatake et al. |
| 6,952,310 | B1 | 10/2005 | Miyatake et al. |
| 6,970,216 | B1 | 11/2005 | Miyatake et al. |
| 7,446,938 | B2 * | 11/2008 | Miyatake et al. ............. 359/500 |

FOREIGN PATENT DOCUMENTS

| | | |
|---|---|---|
| EP | 0 864 905 | 9/1998 |
| EP | 0 952 477 A1 | 10/1999 |
| JP | 6-18873 | 1/1994 |
| JP | 6-160840 | 6/1994 |
| JP | 6-265892 | 9/1994 |
| JP | 7-72475 | 3/1995 |
| JP | 7-27092 | 10/1995 |
| JP | 7-261122 | 10/1995 |
| JP | 08-076114 | 3/1996 |
| JP | 9-54556 | 2/1997 |
| JP | 9-105933 | 4/1997 |
| JP | 09-134607 * | 5/1997 |
| JP | 9-138406 | 5/1997 |
| JP | 9-152604 | 6/1997 |
| JP | 09-274108 | 10/1997 |
| JP | 9-293406 | 11/1997 |
| JP | 09-297204 | 11/1997 |
| JP | 9-326205 | 12/1997 |
| JP | 10-78581 | 3/1998 |
| JP | 11-281975 | 10/1999 |
| WO | WO 95/17699 | 6/1995 |
| WO | WO 95/27919 | 10/1995 |
| WO | WO 97/32223 | 9/1997 |
| WO | WO 97/32224 | 9/1997 |
| WO | WO 97/32226 | 9/1997 |
| WO | WO 97/32227 | 9/1997 |

* cited by examiner

LIGHT PIPE AND POLARIZED-LIGHT SOURCE

This is a divisional of application Ser. No. 10/872,460 filed Jun. 22, 2004, which is a divisional of application Ser. No. 09/569,024 filed May 11, 2000 and issued on Oct. 8, 2005, as U.S. Pat. No. 6,952,310. The entire disclosures of the prior application Ser. Nos. 10/872,460 and 09/569,024 are hereby incorporated by reference.

BACKGROUND OF THE INVENTION

1. Field of the Invention

The present invention relates to a light pipe and a planar polarized-light source which can convert incident light received from its side face to linearly polarized light having uniform brightness which is then emitted from both surfaces thereof under control over oscillating surfaces so that they are suitable for the formation of back light for liquid crystal display device.

The present application is based on Japanese Patent Applications No. Hei. 11-131429, 11-131430, 11-138102, 11166727, 11-174368 and 11-197083, which are incorporated herein by reference.

2. Description of the Related Art

As a side light type light-pipe which can be used as back light for liquid crystal device there has heretofore been known a device comprising a light-emitting means made of reflecting dots or the like provided on a light-transmitting resin plate having an arrangement such that transmitted light produced by total reflection is emitted from one of two surfaces of the plate by scattering or the like. However, the foregoing emitted light is natural light which has little or no polarization and thus needs to be converted to linearly polarized light through a polarizing plate before liquid crystal display. Therefore, the foregoing device is disadvantageous in that the polarizing plate causes absorption loss that prevents the percent utilization of light from exceeding 50%.

Under the foregoing circumstances, a system comprising in addition to the foregoing arrangement a polarized-light converting means having a polarized-light separating plate which utilizes Brewster angle to give linearly polarized light and a retarder plate in combination has been proposed (JP-A-6-18873 (The term "JP-A" as used herein means an "unexamined published Japanese patent application"), JP-A-6-160840, JP-A-6-265892, JP-A-7-72475, JP-A-7-261122, JP-A-7-270792, JP-A-9-54556, JP-A-9-105933, JP-A-9-138406, JP-A-9-152604, JP-A-9-293406, JP-A-9-326205, JP-A-10-78581). However, such a back light cannot provide sufficient polarization and can hardly give control over the polarization direction. Thus, such a back light can hardly be put in practical use.

SUMMARY OF THE INVENTION

An object of the present invention is to provide a light pipe comprising a light-transmitting resin plate and a polarized-light scattering plate laminated on one side or both sides of the light-transmitting resin plate. The polarized-light scattering plate has fine birefringent domains dispersed therein to exhibit a scattering anisotropy attributed to polarization direction.

In accordance with the present invention, in the foregoing arrangement, when natural light is received at a side face, linearly polarized light can be efficiently emitted from both surfaces without the necessity of forming a special light-emitting means such as reflecting dots on a light-transmitting resin plate. Further, when the linearly polarized light passes through the optical axis of a polarized-light scattering plate additionally used, linearly polarized light having the corresponding oscillation direction can be obtained. Accordingly, the oscillation direction of linearly polarized light can be arbitrarily changed by controlling the optical axis of the polarized-light scattering plate. Moreover, polarized-light can be emitted from one surface of such a light pipe with a specular reflection layer provided on the other to enhance the emission efficiency per surface, making it possible to provide linearly polarized light having excellent diffusion properties. By disposing a liquid crystal display element on the light pipe in such an arrangement that the optical axis of the two elements are parallel to each other, brightness nearly twice ordinary value can be accomplished.

In the foregoing description, incident light which has been received at a side face of the light pipe is transmitted by the interior of the light pipe while repeating total reflection due to the difference of refractive index from air, and then enters into the polarized-light scattering plate. Among the components of incident light received by the polarized-light scattering plate, linearly polarized light having an oscillation plane parallel to the axial direction (Δn1 direction) showing the maximum difference of refractive index (Δn1) from fine domains is selectively strongly scattered. A part of the linearly polarized light components which is reflected at an angle smaller than the total reflection angle is emitted by the light pipe. In this arrangement, light is screened on the specular reflection layer side, and then supplied into the opposing side (the other surface of the light pipe free of specular reflection layer). Thus, light emission is concentrated at the other side of the light pipe. Accordingly, linearly polarized light can be diffused from one surface of the light pipe through a light diffusion layer without drastically deteriorating polarization degree and then emitted with a good uniformity.

On the other hand, the light which has been scattered at a great angle in Δn1 direction, the light which has satisfied the requirements for Δn1 direction but has not been scattered, and the light having the oscillation direction other than Δn1 direction are confined in the light pipe by which they are transmitted while repeating total reflection. In this manner, these components wait for an opportunity of being depolarized by the difference in birefringence phase due to polarized-light scattering plate and satisfying the requirements for Δn1 direction to emit themselves. By repeating this process, linearly polarized light having a predetermined oscillation plane can be efficiently emitted from the light pipe.

The foregoing polarized-light scattering plate preferably comprises a transparent film having fine domains dispersed therein comprising a liquid crystal polymer which exhibits nematic at temperatures lower than the glass transition temperature of the polymer constituting matrix of the transparent film and has a glass transition temperature of 50° C. or higher.

In this arrangement, a light pipe having an excellent heat resistance can be obtained. The light pipe thus obtained is little liable to deformation and deterioration of function even when subject to temperature rise after a prolonged operation of light source. Thus, the light pipe of the invention is excellent in durability, particularly in thermal stability.

The present invention further provides a light pipe comprising as a laminate the foregoing polarized-light scattering plate having a specular reflection layer provided on one surface thereof and at least one polarization-retaining lens sheet provided on the other and a planar polarized-light source comprising a light source provided at least on one side face of the light pipe. The path of emitted light can be controlled by the polarization-retaining lens sheet to obtain linearly polarized light excellent in directivity to the front. By disposing a liquid crystal element on the polarization-retaining lens sheet, brightness 1.5 or more times the ordinary value can be realized.

The present invention further provides a light pipe comprising a laminate having a birefringent light-transmitting resin plate, and a polarized-light scattering plate having fine birefringent domains dispersed therein and showing anisotropy in scattering depending on the polarization direction provided on one or both surfaces thereof, said laminate comprising a specular reflection layer provided on one surface thereof, and a planar polarized-light source comprising a light source provided at least on one side face of the light pipe. In this arrangement, the light-transmitting resin plate makes the use of its birefringence to efficiently eliminate polarization and hence increase the foregoing opportunity of emission, making it possible to raise brightness.

The present invention further provides a light pipe comprising a light-transmitting resin plate, and a polarized-light scattering plate having fine birefringent domains dispersed therein and showing anisotropy in scattering depending on the polarization direction partially provided in close contact with one or both surfaces thereof with a light path provided interposed therebetween and a planar polarized-light source comprising a light source provided at least on one side face of the light pipe.

In accordance with the present invention, the light pipe can receive natural light at its side face and then efficiently emit linearly polarized light from both surfaces thereof with a good uniformity in brightness.

In some detail, incident light which has been received at a side face of the light-transmitting resin plate is transmitted by the interior of the resin plate while repeating total reflection due to the difference of refractive index from air, and then undergoes scattering through the light path to enter into the polarized-light scattering plate through which it is then emitted from the light pipe. Accordingly, the amount of incident light and hence brightness can be controlled by the area of contact with the light path.

Features and advantages of the invention will be evident from the following detailed description of the preferred embodiments described in conjunction with the attached drawings.

DETAILED DESCRIPTION OF THE PREFERRED EMBODIMENTS

Figure 1:
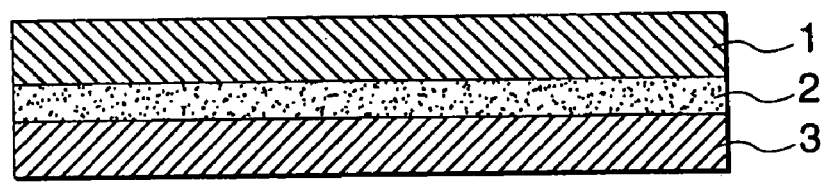
FIG. 1 is a sectional view of an embodiment of the light pipe according to the present invention.
Figure 2:
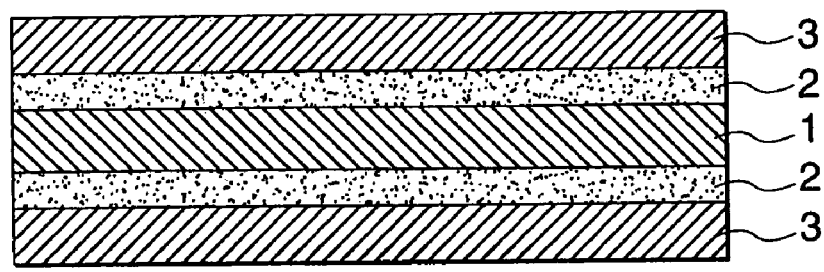
FIG. 2 is a sectional view of another embodiment of the light pipe according to the present invention.

The light pipe according to the present invention comprises a light-transmitting resin plate and a polarized-light scattering plate having fine birefringent domains dispersed therein and showing anisotropy in scattering depending on the polarization direction and laminated on one or both surfaces of the light-transmitting resin plate. An embodiment of the light pipe is shown in FIGS. 1 and 2. The reference numeral 1 indicates a light-transmitting resin plate, the reference numeral 3 indicates a polarized-light scattering plate, and the reference numeral 2 indicates an optional adhesive layer.

The polarized-light scattering plate 3 comprises a transparent film having fine domains comprising a liquid crystal polymer dispersed therein which exhibits nematic at temperatures lower than the glass transition temperature of the polymer constituting the film (matrix polymer) and has a glass transition temperature of 50° C. or higher.

Figure 3:
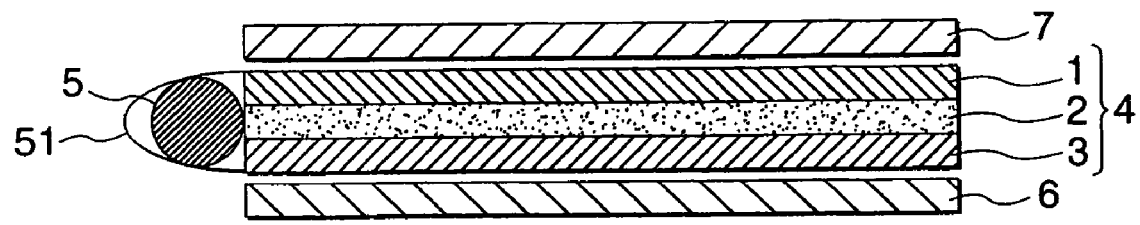
FIG. 3 is a sectional view of an embodiment of the planar polarized-light source according to the present invention.

The light pipe as a laminate may further comprise a specular reflection layer provided on one surface thereof and at least one polarization-retaining light diffusion layer provided on the other. An embodiment of this arrangement is shown in FIG. 3. The reference numeral 4 indicates a laminate (polarized-light scattering plate), the reference numeral 6 indicates a specular reflection layer, and the reference numeral 7 indicates a light diffusion layer. FIG. 3 illustrates an embodiment of the planar polarized-light source comprising the foregoing light pipe. The reference numeral 5 indicates a light source.

Figure 4:
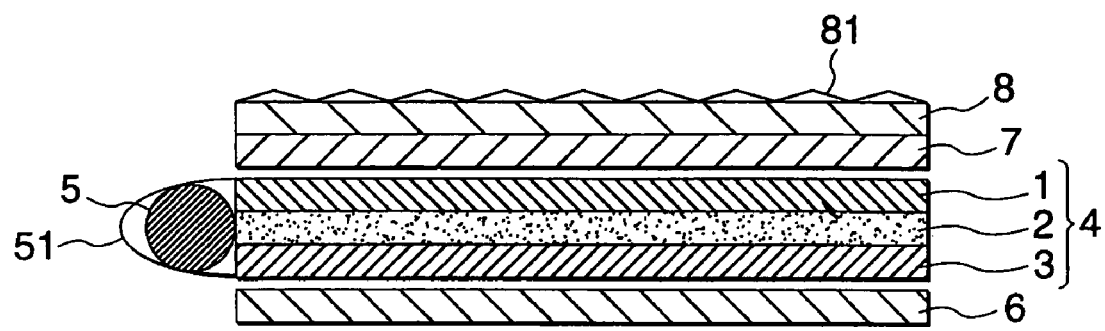
FIG. 4 is a sectional view of another embodiment of the planar polarized-light source according to the present invention.

The foregoing laminate may further comprise a polarization-retaining lens sheet provided on the other surface thereof. In FIG. 4, the reference numeral 8 indicates a lens sheet.

Figure 6:
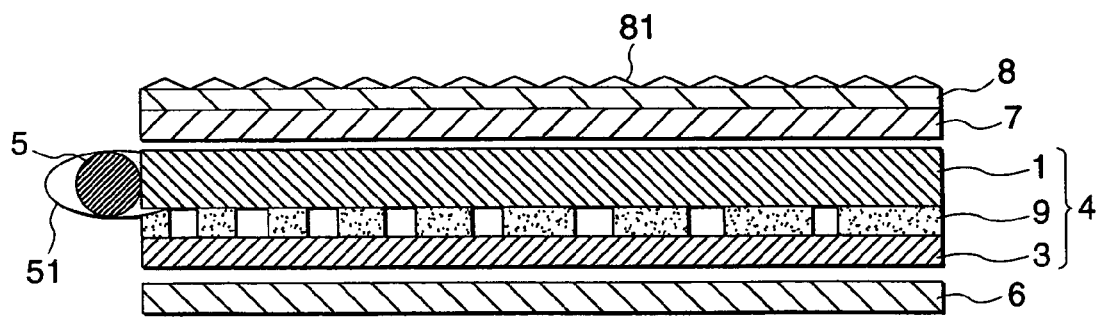
FIG. 6 is a sectional view of a still further embodiment of the planar polarized-light source according to the present invention.

The light pipe according to the present invention may further comprise the foregoing polarized-light scattering plate provided partially in close contact with one or both surfaces of the light-transmitting resin plate with a light path provided interposed therebetween. An embodiment of this arrangement is shown in FIG. 6. The reference numeral 1 indicates a light-transmitting resin plate, the reference numeral 9 indicates a light path, and the reference numeral 3 indicates a polarized-light scattering plate. These components form a laminate 4 as light pipe, having least required units. FIG. 6 illustrates an embodiment of the planar polarized-light source comprising the foregoing light pipe.

As the light-transmitting resin plate there may be used any tabular material formed by a proper material showing transparency to predetermined wavelength of light from the light source. For visible light range, for example, a tabular material made of acrylic resin, polycarbonate resin, styrenic resin, norbornene-based resin, epoxy resin or the like may be preferably used. From the standpoint of light transmittance, tabular material made of a resin having as small refractive index as possible is preferred. Further, taking into account durability, a tabular material made of a resin having an excellent heat resistance is preferred.

As the light-transmitting resin plate there may be used one which exhibits in-plane birefringence for the purpose of eliminating polarization of light transmitted by the interior of the light pipe to increase the opportunity of emission from the polarized-light scattering plate and hence enhance brightness. In order to efficiently eliminate polarization, a material having a phase difference due to birefringence of 50 nm or more, preferably 60 nm or more, particularly 70 nm or more as calculated in terms of average phase difference in plane is preferably used. Further, in order to prevent uneven brightness, a material having as small uneven phase difference as possible is preferably used.

The formation of the birefringent light-transmitting resin plate can be accomplished by any proper method such as method involving the development of orientation birefringence by strain or the like during the formation of plate, method involving stretching, method involving rolling and method involving orientation of resin under the action of electric field or magnetic field. Particularly preferred among these methods is the method involving the development of orientation birefringence by strain or the like from the standpoint of mass production of resin plate. From this standpoint of view, an acrylic resin, polycarbonate resin or the like is preferably used.

In order to maintain the desired polarization properties of the emitted light, a resin plate having as small in-plane phase difference as possible is preferably used. From this standpoint of view, a material which is little liable to orientation birefringence due to strain or the like during the formation of plate, particularly polymethyl methacrylate or norbornene-based resin, is preferably used. Such a resin can be fairly formed into plate.

The shape of the light-transmitting resin plate can be properly determined depending on the size of liquid crystal cell, the characteristics of light source, the degree of uniformity in brightness of emitted light, etc. and thus is not specifically limited. From the standpoint of formability or the like, tabular or wedge-shaped plate is preferably used. The thickness of the light-transmitting resin plate can be properly determined depending on the size of light source and liquid crystal cell and thus is not specifically limited. However, the light-transmitting resin plate is preferably as thin as possible for the purpose of reducing the thickness and weight of the light pipe and is specifically 10 mm or less, particularly from 0.5 to 5 mm.

The formation of the light-transmitting resin plate can be accomplished by any proper method such as injection molding method, casting method, extrusion method, flow casting method, roll coating method, transfer molding method and reaction injection molding method (RIM). For the formation of the light-transmitting resin plate, a proper additive such as discoloration inhibitor, oxidation inhibitor, ultraviolet absorber and release agent may be added to the material.

On the other hand, as the polarized-light scattering plate there may be used any proper material which comprises fine birefringent domains dispersed therein to exhibit anisotropy in scattering depending on the polarization direction. An examples of the polarized-light scattering plate is a transparent film having fine birefringent domains dispersed therein.

For example, there may be used one comprising a transparent film having fine domains comprising a liquid crystal polymer dispersed therein which exhibits nematic at temperatures lower than the glass transition temperature of the polymer constituting the film and has a glass transition temperature of 50° C. or higher and showing anisotropy in scattering depending on the polarization direction. In this arrangement, a polarized-light scattering plate excellent in heat resistance can be obtained, making it possible to form a light pipe excellent in thermal stability.

The formation of the foregoing polarized-light scattering plate showing anisotropy in scattering can be accomplished by any proper method such as method which comprises subjecting one or more proper materials having excellent transparency such as polymer and liquid crystal to proper orientation by stretching or the like in such a combination that regions having different birefringences are formed to obtain an oriented film.

Examples of the foregoing combination include combination of polymer and liquid crystal, combination of isotropic polymer and anisotropic polymer, and combination of anisotropic polymers. From the standpoint of dispersion distribution of fine domains, a combination causing phase separation is preferably used. The dispersion distribution of fine domains can be controlled by the compatibility of the materials to be combined. Phase separation can be accomplished by any proper method such as method which comprises solubilizing noncompatible materials with a solvent and method which comprises heating and melting noncompatible materials in admixture.

In the case where orientation is carried out by stretching in the foregoing combination, the desired polarized-light scattering plate can be formed by stretching at arbitrary temperature and stretching ratio if the combination of polymer and liquid crystal and the combination of isotropic polymer and anisotropic polymer are used or by properly controlling the stretching conditions if the combination of anisotropic polymers is used. Anisotropic polymers can be classified as positive or negative according to the change of refractive index in the stretching direction. In the present invention, both positive and negative anisotropic polymers can be used. Any of combination of positive anisotropic polymers, combination of negative anisotropic polymer and combination of positive anisotropic polymer and negative anisotropic polymer can be used.

Examples of the foregoing polymers include ester-based polymer such as polyethylene terephthalate and polyethylene naphthalate, styrene-based polymer such as polystyrene and acrylonitrile-styrene copolymer (AS polymer), olefinic polymer such as polyethylene, polypropylene, polyolefin having cyclo or norbornene structure and ethylene-propylene copolymer, acrylic polymer such as polymethyl methacrylate, cellulose-based polymer such as cellulose biacetate and cellulose triacetate, and amide-based polymer such as nylon and aromatic polyamide.

Further examples of the foregoing transparent polymer include thermosetting or ultraviolet-curing polymers such as carbonate-based polymer, vinyl chloride-based polymer, imide-based polymer, sulfon-based polymer, polyether sulfone, polyether ether ketone, polyphenylene sulfide, vinyl alcohol-based polymer, vinylidene chloride-based polymer, vinyl butyral-based polymer, arylate-based polymer, polyoxymethylene, silicone-based polymer, urethane-based polymer, ether-based polymer, vinyl acetate-based polymer, blend of the foregoing polymers, phenolic polymer, melamine-based polymer, acrylic polymer, urethane-based polymer, urethane acryl-based polymer, epoxy-based polymer, and silicone-based polymer.

In particular, a polymer excellent in transparency in a desired wavelength range such as visible light range is preferred. In order to obtain a polarized-light scattering plate excellent in thermal stability, there is preferably used a polymer having a deflection temperature of 80° C. or higher under load and a glass transition temperature of 110° C. or higher, more preferably 115° C. or higher, particularly 120° C. or higher. The measurement of deflection temperature under load is conducted according to JIS K 7207. In some detail, a -heat transfer medium in a heating bath is heated at a rate of 2° C./min while a specimen having a height of 10 mm in the heating bath is under the application of a bending stress of 18.5 kgf/cm$^2$. The temperature of the heat transfer medium at which the deflection of the specimen reached 0.32 mm is defined as deflection temperature under load.

Examples of the liquid crystal include low molecular liquid crystal or crosslinkable liquid crystal monomer which exhibits nematic or smectic at room temperature or high temperatures such as cyanobiphenyl-based compound, cyanophenyl-cyclohexane-based compound, cyanophenylester-based compound, benzoic acid phenylester-based compound, phenylpyrimidine-based compound and mixture thereof, and liquid crystal polymer which exhibits nematic or smectic at room temperature or high temperatures. The foregoing crosslinkable liquid crystal monomer is normally subjected to orientation followed by crosslinking by a proper means such as heat and light to become a polymer.

In order to obtain a polarized-light scattering plate excellent in heat resistance, durability, etc., it is preferred that a polymer having a glass transition temperature of 50° C. or higher, more preferably 80° C. or higher, particularly 120° C. or higher, and a crosslinkable liquid crystal monomer or liquid crystal polymer be used in combination. As the liquid crystal polymer there may be any proper material such as main-chain type compound and side-chain type compound. The kind of the liquid crystal polymer is not specifically limited.

The formation of the polarized-light scattering plate by a liquid crystal polymer can be accomplished by a process which comprises mixing one or more polymers and one or more liquid crystal polymers for forming fine domains, forming a polymer film having the liquid crystal polymer dispersed therein in the form of minute region, and then subjecting the polymer film to proper orientation to form regions having different birefringences.

From the standpoint of ease of control over the foregoing refractive index differences Δn1 and Δn2 by orientation, as the liquid crystal polymer for forming fine domains there may be used one which has a glass transition temperature of 50° C. and exhibits nematic at temperatures lower than the glass transition temperature of the polymer constituting the film. The kind of the liquid crystal polymer to be used herein is not specifically limited. A proper liquid crystal polymer of main-chain type or side-chain type which exhibits such properties can be used.

Specific examples of the foregoing liquid crystal polymer include a side-chain liquid crystal polymer having a monomer unit represented by the following general formula. The side-chain type liquid crystal polymer may be a proper thermoplastic polymer such as homopolymer and copolymer having such a monomer unit. In particular, such a thermoplastic polymer excellent in monodomain orientability is preferred.

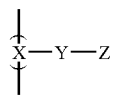

In the foregoing general formula, X represents a skeleton group forming the main chain of the liquid crystal polymer which may be formed by a proper connecting chain such as linear, branched and cyclic chain. Examples of the skeleton group include polyacrylate, polymethacrylate, poly-α-haloacrylate, poly-α-cyanoacrylate, polyacrylamide, polyacryloylnitrile, polymethacrylonitrile, polyamide, polyester, polyurethane, polyether, polyimide, and polycyloxane.

Y represents a spacer group branched from the main chain. From the standpoint of formability of polarized-light scattering plate such as ease of control over refractive index. Examples of the spacer group include ethylene, propylene, butylene, pentylene, hexylene, octylene, decylene, undecylene, dodecylene, octadecylene, ethoxyethylene, and methoxybutylene.

On the other hand, Z represents a mesogen group for imparting liquid crystal orientability (nematic orientability). Examples of the mesogen group will be given below.

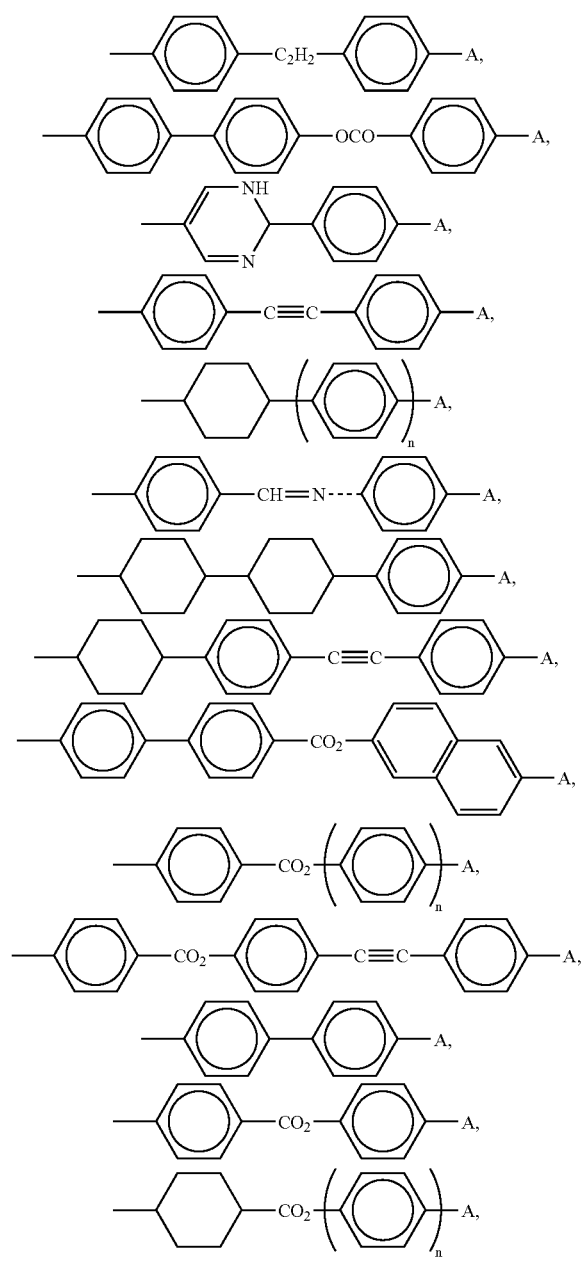

In the foregoing compounds, the terminal substituent A may be a proper group such as cyano group, alkyl group, alkenyl group, alkoxy group, oxalkyl group and haloalkyl group, haloalkoxy group and haloalkenyl group having one or more hydrogen atoms substituted by fluorine or chlorine.

The spacer group Y and the mesogen group Z may be connected to each other via an ether bond, i.e., —O—. The phenyl group in the mesogen group Z may have one or more hydrogen atoms substituted by halogen. The halogen to be used is preferably chlorine or fluorine.

The formation of the polarized-light scattering plate by the foregoing nematically orientable liquid crystal polymer can be accomplished, e.g., by a process which comprises mixing a polymer for forming a polymer film and a liquid crystal polymer, forming a polymer film having the liquid crystal polymer dispersed therein in the form of minute region, subjecting the polymer film to heat treatment so that the liquid crystal polymer for forming fine domains is oriented in liquid-crystalline arrangement, and then cooling the polymer film so that orientation is fixed.

In particular, the formation of the polarized-light scattering plate can be accomplished, e.g., by a process which comprises mixing one or more polymers for forming a film and one or more liquid crystal polymers for forming fine domains which exhibits nematic at temperatures lower than the glass transition temperature of the foregoing polymer and has a glass transition temperature of 50° C. or higher, forming a polymer film having the liquid crystal polymer dispersed therein in the form of minute region, subjecting the polymer film to heat treatment so that the liquid crystal polymer for forming fine domains is oriented in nematic liquid crystal phase, and then cooling the polymer film so that the orientation is fixed.

In order to obtain a polarized-light scattering plate excellent in heat resistance and durability, there is preferably used a liquid crystal polymer having a glass transition temperature of 60° C. or higher, more preferably 70° C. or higher, particularly 80° C. or higher. From the standpoint of ease of formation of fine domains having an excellent uniformity in particle diameter distribution, thermal stability, formability into film and ease of orientation, a liquid crystal polymer having a polymerization degree of 8 or more, preferably 10 or more, particularly from 15 to 5,000 is desirable.

From the standpoint of dispersion distribution of fine domains in the light pipe thus obtained, the polymer for forming a film and the liquid crystal polymer for forming fine domains are preferably used in such a combination that phase separation takes place. The dispersion distribution of fine domains can be controlled by compatibility attained by such a combination. Phase separation can be accomplished, e.g., by any proper method such as method which comprises solubilizing noncompatible materials with a solvent and method which comprises heating and melting noncompatible materials in admixture.

The formation of the foregoing polymer film having fine domains dispersed therein, i.e., film to be oriented, can be accomplished, e.g., by any proper method such as casting method, extrusion method, injection molding method, rolling method and flow casting method. Alternatively, the formation of the foregoing polymer film can be accomplished by a method which comprises spreading the polymer in the form of monomer, and then subjecting the material to heat treatment or irradiation with ultraviolet rays or the like to form a film.

In order to obtain a polarized-light scattering plate excellent in uniformity in distribution of fine domains, there is preferably used a method which comprises subjecting a mixture of film-forming materials with a solvent to casting or flow casting to form a film. In this case, the size and distribution of fine domains can be controlled by the kind of the solvent, the viscosity of the mixture, the drying rate of the mixture-spread layer, etc. For example, the reduction of the area of fine domains can be advantageously accomplished by lowering the viscosity of the mixture or raising the drying rate of the mixture-spread layer.

The thickness of the film to be oriented can be properly determined. In practice, however, it is preferably from 1 µm to 3 mm, more preferably from 5 µm to 1 mm, particularly from 10 µm to 500 µm from the standpoint of orientability. During the formation of film, the material may comprise a proper additive such as dispersant, surface active agent, ultraviolet absorber, color toner, fire retardant, release agent and oxidation inhibitor incorporated therein.

Orientation can be accomplished by one or more proper methods which allow control over refractive index by orientation such as stretching method or rolling method such as uniaxial, biaxial, successive biaxial or Z-axis method, method which comprises applying an electric field or magnetic field to the material at a temperature of not lower than glass transition temperature or liquid crystal transition temperature, and then rapidly cooling the material to fix orientation, method involving flow orientation during film forming and method involving self-orientation of liquid crystal according to slight orientation of isotropic polymer. Accordingly, the polarized-light scattering plate thus obtained may be a stretched film or unstretched film. In the case where a stretched film is produced, a brittle polymer, too, may be used. However, a polymer excellent in extensibility is particularly desirable.

In the case where the fine domains are made of the foregoing liquid crystal polymer, there may be used a method which comprises heating the material to a temperature at which the liquid crystal polymer to be dispersed and distributed in the polymer film in the form of fine domains shows a desired liquid crystal phase such as nematic phase so that it is melted, subjecting the material to orientation under the action of an orientation regulating force, and then rapidly cooling the material so that orientation is fixed. The orientation of fine domains is preferably in the state of as monodomain as possible to inhibit scatter of optical properties.

As the orientation regulating force there may be used a proper regulating force capable of orienting liquid crystal polymer such as stretching force to be used in a method involving stretching a polymer film at a proper draw ratio, shearing force to be used during the film formation and electric or magnetic field. One or more of these regulating forces can be acted upon the polymer film to orient the liquid crystal polymer.

Accordingly, the portion other than the fine domains in the polarized-light scattering plate, i.e., matrix of the transparent film (polymer film portion) may exhibit birefringence or may be isotropic. The polarized-light scattering plate which entirely exhibits birefringence can be obtained by subjecting an orientation-birefringent film-forming polymer to molecular orientation during the foregoing film-forming process. If necessary, the polymer may be subjected to a known orientation such as stretching so that it is rendered birefringent or controlled in birefringence.

The polarized-light scattering plate which is isotropic in regions other than the fine domains can be obtained by subjecting an isotropic film-forming polymer to stretching at temperatures of not higher than the glass transition temperature of the polymer.

A preferred embodiment of the polarized-light scattering plate is controlled such that in the axial direction ($\Delta n1$ direction) which is maximum among the difference in refractive index in the various light axes of fine domains between the fine domains and other portions as the polymer film portion, i.e., $\Delta n1$, $\Delta n2$ and $\Delta n3$, $\Delta n1$ is 0.03 or more, and in the two other axial directions perpendicular to $\Delta n1$ direction ($\Delta n2$ and $\Delta n3$ directions) $\Delta n2$ and $\Delta n3$ each are 50% or less of $\Delta n1$. $\Delta n2$ and $\Delta n3$ are preferably equal to each other.

By using the foregoing refractive index, linearly polarized light in Δn1 direction is strongly scattered at an angle smaller than the total reflection angle, making it possible to increase the amount of light emitted from the light pipe. Linearly polarized light in other directions can hardly be scattered and thus is repeatedly totally reflected, making it possible to confine itself in the light pipe.

In the foregoing description, the difference between the refractive index of the fine domains in the various axial directions and that of portions other than the fine domains means the difference between the refractive index of the fine domains in the various directions and the average refractive index of the polymer film if the film-forming polymer is optically isotropic. If the film-forming polymer is optically anisotropic, it means the difference between the refractive index of the polymer film in the main optical axial direction and that of the fine domains in the main optical axial direction because the two main optical directions are usually the same.

From the standpoint of the foregoing total reflection, the refractive index difference Δn1 in Δn1 direction is preferably properly great, more preferably from 0.035 to 1, particularly from 0.045 to 0.5. The refractive index differences Δn2 and Δn3 in Δn2 and Δn3 directions, respectively, are each preferably properly small. These refractive index differences can be controlled by adjusting the refractive index of the material used or conducting the foregoing orientation.

Since the foregoing Δn1 direction corresponds to the oscillation plane of linearly polarized light emitted by the light pipe, it is preferably parallel to the surface of the polarized-light scattering plate. Δn1 direction in plane may be proper depending on the desired liquid crystal cell or the like.

From the standpoint of homogeneity in scattering effect, the fine domains are preferably dispersed and distributed in the polarized-light scattering plate as homogeneously as possible. The size of the fine domains, particularly Δn1 direction, which is the scattering direction, is related to back scattering (reflection) or dependence on wavelength.

From the standpoint of enhancement of percent utilization of light, prevention of coloring due to dependence on wavelength, prevention of obstruction of vision of fine domains by sight, prevention of obstruction of clear display, film-forming properties and film strength, the preferred size of the fine domains, particularly the preferred length of Δn1 direction, is from 0.05 to 500 μm, more preferably from 0.1 to 250 μm, particularly from 1 to 100 μm. Although the fine domains are usually present in the polarized-light scattering plate in the form of domain, its length Δn2 direction is not specifically limited.

The proportion of the fine domains in the polarized-light scattering plate can be properly determined by the scattering properties in Δn1 direction. In practice, however, it is preferably from 0.1 to 70% by weight, more preferably from 0.5 to 50% by weight, particularly from 1 to 30% by weight, taking into account the film strength as well.

The polarized-light scattering plate can be formed in the form of single layer made of the foregoing film showing birefringence. Two or more of such a film can be laminated to form the polarized-light scattering plate. The lamination of these films makes it possible to exert a synergistic scattering effect greater than developed by the increase of the thickness. The lamination may be conducted such that the films are arranged at arbitrary angle such as Δn1 or Δn2 direction. From the standpoint of enhancement of scattering effect, the lamination is preferably conducted such that Δn1 direction of two vertically adjacent layers are parallel to each other. The laminated number of films is an arbitrary number of 2 or more.

The films to be laminated may have the same or different Δn1 or Δn2 directions. The Δn1 direction or the like of the vertically adjacent layers are as parallel to each other as possible. However, deviation due to error in working is tolerated. When Δn1 direction or the like scatters, the values of Δn1 direction may be averaged.

The films to be laminated are bonded to each other with an adhesive layer in such an arrangement that the total reflection surface is the outermost surface. As the adhesive there may be used any proper adhesive such as hot-melt adhesive and tacky adhesive. In order to inhibit reflection loss, an adhesive layer having as small refractive index difference from the foregoing films as possible is preferably used. These films may be bonded to themselves or using the polymer for forming fine domains.

The light pipe preferably has a phase difference as a whole or in part because polarization can be properly eliminated while light is being transmitted by the interior of the light pipe to advantage from the standpoint of percent utilization of light. Since the retardation axis of the scattering light pipe and the polarization axis (oscillation plane) of the linearly polarized light are essentially perpendicular to each other, it is thought that polarization conversion due to phase difference can hardly take place but a slight scattering causes the change of apparent angle that results in polarization conversion.

From the standpoint of the foregoing polarization conversion, it is usually preferred that there occur an in-plane phase difference of 5 nm or more, though depending on the thickness of the scattering light pipe. The phase difference can be imparted by a proper method such as method which comprises allowing birefringent particles to be incorporated in the scattering light pipe, method which comprises attaching birefringent particles to the surface of the scattering light pipe, method which comprises rendering the polymer film birefringent and combination thereof.

The light pipe according to the present invention comprises a laminate of a light-transmitting resin plate and a polarized-light scattering plate. For the formation of the light pipe of the invention, it is preferred that the light-transmitting resin plate 1 and the polarized-light scattering plate 3 be bonded to each other with an adhesive or the like having a refractive index as close to that of the two layers as possible to inhibit reflection by the interface of the light-transmitting resin plate 1 with the polarized-light scattering plate 3 as much as possible, i.e., to facilitate the transmission of light between the light-transmitting resin plate and the polarized-light scattering plate and hence realize the total reflection by both surfaces of the light pipe made of a close laminate of the two layers, as shown in FIG. 1. Bonding is effective from the standpoint of prevention of deviation of axis. For the formation of the light pipe, a polarized-light scattering plate 3 may be provided on both surfaces of the light-transmitting resin plate 1 as shown in FIG. 2.

For the formation of the laminate of light-transmitting resin plate and polarized-light scattering plate, it is preferred that the light-transmitting resin plate and the polarized-light scattering plate be arranged such that the average retardation axis of the light-transmitting resin plate and the optical axis (oscillation plane of emitted polarized-light) cross at an angle of 5 degrees or more, more preferably from 10 to 80 degrees, particularly from 15 to 75 degrees, in order to efficiently eliminate the polarization of transmitted light.

For the foregoing bonding, a proper adhesive such as transparent adhesive (e.g., acrylic adhesive, silicone adhesive, polyester-based adhesive, polyurethane-based adhesive, polyether-based adhesive, rubber adhesive) may be used as in the case of the foregoing laminate type polarized-light scattering plate. Thus, there is no special restriction on bonding. From the standpoint of prevention of change of optical characteristics, an adhesive requiring no high temperature prolonged curing and drying process is preferred. Further, an adhesive which is not liable to floating or peeling under heating or moistening conditions is preferred.

From the foregoing standpoint of view, there is preferably used an acrylic adhesive comprising as a base polymer an acrylic polymer having a weight-average molecular weight of 100,000 or more obtained by the copolymerization of a (meth)acrylic acid alkylester having an alkyl group having 20 or less carbon atoms such as methyl, ethyl and butyl and an acrylic monomer comprising a modified component such as (meth)acrylic acid and (meth)acrylic acid hydroxyethyl in such a combination that the resulting glass transition temperature is 0° C. or lower. Such an acrylic adhesive is also advantageous in that it is excellent in transparency, weathering resistance and heat resistance.

The provision of the adhesive layer on the light-transmitting resin plate and/or the polarized-light scattering plate can be accomplished by any proper method. Examples of such a method include a method which comprises dissolving or dispersing an adhesive component in proper solvents such as toluene and ethyl acetate, singly or in admixture, to prepare an adhesive solution having a concentration of from about 10 to 40% by weight, and then providing the adhesive solution directly on a light-transmitting resin plate or polarized-light scattering plate by any proper spreading method such as casting method and coating method, and a method which comprises forming an adhesive layer on a separator in the same manner as mentioned above, and then transferring the adhesive layer onto a light-transmitting resin plate or polarized-light scattering plate. The adhesive layers to be provided may be laminating layers having different compositions or kinds.

The thickness of the adhesive layer can be properly determined by adhesivity or the like. It is normally from 1 to 500 μm. The adhesive layer may comprise a filler such as natural or synthetic resin, glass fiber, glass beads, metal powder and other inorganic powder or a proper additive such as pigment, colorant and oxidation inhibitor incorporated therein as necessary. Further, the adhesive layer may comprise finely divided particles incorporated therein to exhibit light diffusion properties.

The light pipe according to the present invention acts to convert incident light received at its side face to linearly polarized light which is then emitted from both surfaces thereof as mentioned above and thus can be preferably used to form a planar polarized-light source. The planar polarized-light source can be formed by disposing a light source 5 at least on one side face of the light pipe 4 as shown in FIG. 3.

In order to obtain a planar polarized-light source having excellent brightness, it is preferred that a specular reflection layer 6 be provided on one surface of the light pipe 4 as shown in FIG. 3. In this arrangement, the light emitted from the reflection layer side can be inverted by the specular reflection layer and concentrated onto one surface of the light pipe without changing its polarization state, making it possible to enhance brightness.

As the foregoing light source there may be used any proper light source which can be disposed on the side face of the light pipe, such as (cold, hot) cathode ray tube, linear or planar array of light-emitting diodes and incandescent lamp. In particular, cold cathode ray tube is preferred from the standpoint of light emission efficiency, reduction of consumption of electric power and reduction of diameter. The light source may be disposed on plural side faces such as two opposing side faces or three side faces to enhance brightness or uniformity. In the case where three sides faces are used, a U-shaped tube may be used.

For the formation of the planar polarized-light source, if necessary, a proper auxiliary means such as reflector 51 surrounding the light source 5 may be disposed to introduce scattered light from the light source into the side face of the light pipe as shown in FIG. 3. As such a reflector there may be normally used a resin sheet provided with a thin metal layer having a high reflectance or a metal foil. The reflector may extend to the lower surface of the light pipe to act as a reflection layer as well. The reflector is useful also as a light source fixing means.

On the other hand, the foregoing specular reflection layer 6 is preferably as specular as possible from the standpoint of retention of polarization. From this standpoint of view, a reflecting surface made of metal is particularly preferred. As such a metal there may be used any proper metal such as aluminum, silver, chromium, gold, copper, tin, zinc, indium, palladium, platinum and alloy thereof.

The reflection layer 6 may be formed by vacuum-evaporating such a metal on the light pipe to a small thickness so that it is kept in direct contact with the light pipe. However, the vacuum-deposited metal can hardly make total reflection. The reflection layer makes some absorption of light. Therefore, absorption loss can be apprehended taking into account the repetition by total reflection. In order to inhibit absorption loss, the arrangement is preferably such that the reflector is merely superposed on the light pipe so that an air layer is provided interposed therebetween. Accordingly, from this standpoint of view, the reflector is preferably formed by sputtering or vacuum-evaporating a metal onto the supporting substrate to a small thickness. Alternatively, a tabular metal material such as metal foil and rolled sheet of metal is preferably used. As the supporting substrate for reflector there may be used a proper material such as glass plate and resin sheet. In particular, a resin sheet having silver or aluminum vacuum-deposited thereon is preferably used from the standpoint of reflectance, tint and handleability. The reflection layer may be disposed either surface of the light pipe.

Figure 5:
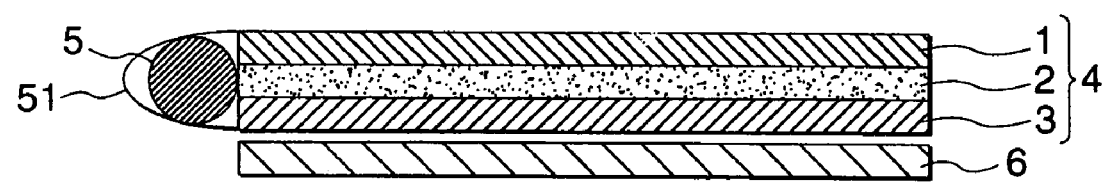
FIG. 5 is a sectional view of a further embodiment of the planar polarized-light source according to the present invention.

For the formation of the planar polarized-light source, one or more proper optical layers such as diffusion layer 7 as shown in FIG. 3 may be disposed at a proper position. The optical layer to be used herein is not specifically limited. For example, a proper material such as optical layer used to form a liquid crystal display device may be used. FIG. 5 is an embodiment of the planar polarized-light source free of light diffusion layer 7.

The polarization-retaining light diffusion layer 7 to be provided on the other surface of the light pipe 4 as laminate, i.e., the surface of the light pipe on which the foregoing specular reflection layer is not provided, is intended to diffuse light (linearly polarized light) emitted by the laminate while maintaining its polarization as much as possible and hence uniformalize emission, making it possible to enhance its visibility.

Further, the light diffusion layer may be also disposed as necessary for the purpose of enhancing visibility by relaxation of sight through concave-convex pattern on lens sheet described later.

In the present invention, in order to efficiently utilize linearly polarized light emitted by the light pipe, if an optical layer, particularly polarizing plate is provided on the emission side of the light pipe, the optical layer to be disposed between the polarizing plate and the light pipe is preferably one which exhibits an excellent light transmittance and maintains the linear polarization (polarization degree) of emitted light as much as possible without eliminating it. In particular, the optical layer preferably exhibits a total light transmittance of 80% or more, more preferably 85% or more, particularly 90% or more and a percent leakage (transmittance) of 5% or less, more preferably 2% or less, particularly 1% or less, as developed by the elimination of polarization through the arrangement disposed of cross-Nicol.

In the light of the fact that the elimination of polarization is usually made by birefringence or multiple scattering, the optical layer showing polarization-retaining properties can be realized by lowering birefringence as much as possible or reducing the number of average reflections (scattering) in the orbit of rays. From this standpoint of view, the optical layer is preferably formed by a resin having a low birefringence (resin having a good optical isotropy) such as cellulose triacetate-based resin, methyl polymethacrylate, polycarbonate and norbornene-based resin. One or more of these resins may be used.

The light diffusion layer excellent in polarization-retaining properties can be provided with a finely roughened structure on the surface thereof by a proper method such as method which comprises allowing transparent particles to be dispersed in a layer made of a resin having a small birefringence and method which comprises roughening the surface of a resin layer. Examples of the transparent particles employable herein include finely divided particles of material which may be electrically conductive, such as silica, glass, titania, zirconia, tin oxide, indium oxide, cadmium oxide and antimony oxide, and finely divided particles made of crosslinked or uncrosslinked polymer such as acrylic polymer, polyacrylonitrile, polyester, epoxy resin, melamine-based resin, urethane-based resin, polycarbonate, polystyrene, silicone-based resin, benzoguanamine, melamine-benzoguanamine condensate and benzoguanamine-formaldehyde condensate. One or more of these compounds may be used.

The diameter of the transparent particles is preferably from 1 to 20 μm from the standpoint of diffusibility of light and uniformity in diffusion. The shape of the particles is arbitrary. In practice, however, spherical particles or secondary aggregates thereof may be used. In particular, from the standpoint of polarization-retaining properties, transparent particles having a refractive index ratio of from 0.9 to 1.1 to resin is preferably used.

The formation of the light diffusion layer having transparent particles incorporated therein can be accomplished by any proper conventional method such as method which comprises mixing a molten resin solution with transparent particles, and then extruding the mixture to form a sheet or the like, method which comprises incorporating transparent particles in a resin solution or monomer, casting the mixture into a sheet, and then optionally subjecting the sheet to polymerization and method which comprises applying a resin solution having transparent particles incorporated therein to a predetermined surface or polarization-retaining supporting film.

On the other hand, the formation of the light diffusion layer having a finely roughened structure on the surface thereof can be accomplished by any proper method such as method which comprises roughening the surface of a sheet made of an optically isotropic light-transmitting resin by buffing using sandblast or the like or embossing and method which comprises forming a light-transmitting material layer having protrusions on the surface of the foregoing sheet. However, a method which comprises forming a roughness (protrusion) having a great difference in refractive index between bubble such as air or titanium oxide particles and light-transmitting resin is not desirable because it can easily eliminate polarization.

Referring to the finely roughened structure on the surface of the light diffusion layer, the surface roughness of the light diffusion layer is preferably from not less than the wavelength of incident light to not more than 100 μm and nonperiodic from the standpoint of diffusibility of light or uniformity in diffusion. For the formation of the foregoing transparent particle-incorporated type or roughened surface type light diffusion layer, it is preferred that the base layer made of light-transmitting resin be prevented from suffering from the rise in phase difference due to optical elasticity or orientation as much as possible from the standpoint of polarization-retaining properties or the like.

One or more such light diffusion layers may be provided on the emission side of the laminate. Two or more light diffusion layers, if any, may be the same or different. However, these light diffusion layers preferably have the foregoing polarization-retaining properties as a whole. It is preferred that the light diffusion layer be arranged with a gap formed with respect to the laminate as in the case of the foregoing specular reflection layer. The gap is preferably sufficiently greater than the wavelength of incident light from the standpoint of total reflection.

The polarization-retaining lens sheet 8 to be provided on the other surface of the laminate 4 in the embodiment of FIG. 4, i.e., on the surface of the laminate free of specular reflection layer, is intended to control the light path of scattered emitted light (linearly polarized light) from the laminate while maintaining the polarization degree thereof as much as possible, thereby improving the directivity to the front to advantage in vision and hence allowing the intensity peak of scattered emitted light to appear in the front direction.

As the lens sheet there may be used any proper material capable of controlling the light path of incident light received at one surface thereof and efficiently emitting it from the other in the direction as perpendicular to the surface of the sheet as possible (forward direction). Thus, the lens sheet is not specifically limited. Accordingly, any material having various lens forms used in the conventional side light type light pipe may be used except for polarization-retaining properties (JP-A-5-169015).

As the lens sheet to be used herein there may be used one having an excellent light transmittance which prevents the elimination of polarization properties of emitted light, e.g., having a total light transmittance of 80% or more, preferably 85% or more, particularly 90% or more and a percent leakage (transmittance) of 5% or less, more preferably 2% or less, particularly 1% or less, as developed by the elimination of polarization through the arrangement of cross-Nicol.

Since the elimination of polarization takes place by birefringence or multiple scattering, the foregoing lens sheet showing polarization-retaining properties can be realized by lowering the birefringence as much as possible or reducing the number of average reflections (scattering) in the orbit of light ray. In some detail, the lens sheet can be formed by one or more of the polymers exemplified with reference to the light-transmitting resin plate or scattering polarization plate, particularly resins having a low birefringence (resins having a good optical isotropy) such as celluose triacetate-based resin, methyl polymethacrylate, polycarbonate and norbornene-based resin.

As the lens sheet there may be used one having a proper lens form such as one having many convex type or refractive index distribution type (GI type) regions the refractive index of which is controlled by a photopolymer or the like, particularly minute lens regions formed on the surface or inside a transparent resin substrate optionally comprising resins having different refractive indexes, one having lens regions formed by filling many through-holes provided in a transparent resin substrate with a polymer having a different refractive index from that of the resin and one having a single layer of many spherical lens fixed with a thin layer. From the standpoint of control over the light path utilizing the difference in refractive index, the lens sheet is preferably in a form having a particular lens structure 81 of a roughened structure on either or both surfaces, particularly either surface of the sheet 8 as shown in FIG. 4.

The roughened structure forming the foregoing lens form may be arbitrary so far as it acts to control the light path of light transmitted by the sheet and converge the transmitted light toward the front. Examples of the roughened structure include a striped or lattice-shaped alignment of linear grooves or protrusions having a triangular section, and a dotted alignment of many conical minute protrusions having a bottom such as triangular pyramid, quadrangular pyramid and polyangular pyramid. The linear or dotted roughened structure may be a spherical lens, nonspherical lens or semi-cylindrical lens. Thus, a proper lens form may be used.

The formation of the foregoing lens sheet having a linear or dotted roughened structure can be accomplished by a proper method such as method which comprises packing a resin solution or a resin-forming monomer into a mold for forming a predetermined roughened structure, and then optionally subjecting the material to polymerization to transfer the roughened pattern to the material and method which comprises hot-pressing a resin sheet against the mold to transfer the roughened pattern to the resin sheet. The lens sheet may be formed by the same kind of material as the supporting sheet, e.g., one obtained by providing the supporting sheet with a lens form. Alternatively, two or more different resin layers may be laminated to form a lens sheet.

One or more lens sheets may be disposed-on the emission side of the laminate. Two or more lens sheets, if any, may be the same or different. However, these layers preferably maintain polarization-retaining properties as a whole. When the lens sheet is disposed adjacent to the laminate (light pipe), the arrangement is preferably such that a gap is formed therebetween. The gap is preferably sufficiently greater than the wavelength of incident light from the standpoint of total reflection.

In the case where the lens form in the lens sheet is made of a linear roughened structure, the linear direction of the lens form is preferably arranged parallel to or perpendicular to the optical axis of the polarized-light scattering plate (oscillation plane of emitted polarized-light) from the standpoint of control over the light path toward the front. In the case where two or more such lens sheets are arranged, the arrangement is preferably such that the linear direction of two vertically adjacent layers cross each other from the standpoint of control over the light path.

As shown in FIG. 4, one or more polarization-retaining light diffusion layers 7 mentioned above may be disposed between the lens sheet and the laminate or on the emission side of the lens sheet, on the emission side of the laminate 4 as light pipe, together with the lens sheet 8 for the purpose of diffusing emitted light (linearly polarized light) while maintaining its polarization as much as possible to uniformalize emission or relax vision of pattern of lens sheet, thereby enhancing visibility.

The light diffusion layer may be disposed as an independent layer made of tabular material or may be disposed as a dependent layer integrated with the lens sheet. In the case where the light diffusion layer is disposed adjacent to the laminate, the arrangement is preferably such that a gap is formed therebetween as in the case of lens sheet. Two or more light diffusion layers, if any, may be the same or different. However, these layers preferably maintain polarization-retaining properties as a whole.

The optical layer to be arranged far from the light pipe may be bonded to the laminate with an adhesive layer or the like as necessary. However, the optical layer having a roughened surface structure such as the foregoing roughened surface type light diffusion layer and lens sheet having a roughened structure is preferably arranged so as to have a gap. Accordingly, the optical layer such as light diffusion layer may be arranged as an independent layer made of tabular material or may be arranged as a dependent layer integrated closely with other optical layers.

In the case where the light diffusion layer 7 and the lens sheet 8 are used in combination as shown in FIG. 4, one or more light diffusion layers may be disposed between the lens sheet and the light pipe and/or on the emission side of the lens sheet. Referring to the lens sheet having a lens form comprising a linear roughened structure, the arrangement is preferably such that the linear direction of the lens form is parallel to or perpendicular to the optical axis of the polarized-light scattering plate from the standpoint of control over the light path toward the front. When two or more such lens sheets are arranged, the arrangement is preferably such that the linear direction of two vertically adjacent layers cross each other from the standpoint of efficiency in control over the light path.

The light pipe shown in FIG. 6 comprises a laminate 4 having a polarized-light scattering plate 3 partially kept in close contact with one or both surfaces of the light-transmitting resin plate 1 with a light path 9 which also acts as an adhesive layer provided therebetween as shown in FIG. 6 for the purpose of controlling the amount of transmitted light received at the polarized-light scattering plate from the light-transmitting resin plate.

In accordance with the foregoing description, the use of an isolation arrangement such that the light-transmitting resin plate and the polarized-light scattering plate are disposed with a gap interposed therebetween makes it possible to satisfy requirements for total reflection and hence keep the transmitted light in the light-transmitting resin plate. Further, the transmitted light can be scattered through the light path so that it is introduced from the light-transmitting resin plate to the polarized-light scattering plate through the light path. During this process, by adjusting the disposition of the light path, the amount of light received at the polarized-light scattering plate from the light-transmitting resin plate can be controlled, hence making it possible to uniformalize brightness on the light pipe.

The light path may be eventually interposed between the light-transmitting resin plate and the polarized-light scattering plate. Accordingly, the light path can be formed by any proper method. For example, the formation of the light-transmitting resin plate or polarized-light scattering plate may be accompanied by the formation of a roughened structure on one or both surfaces thereof to form a roughened structure integrally with the light-transmitting resin plate or polarized-light scattering plate, thereby laminating the light-transmitting resin plate and the polarized-light scattering plate with the roughened structure interposed therebetween.

Alternatively, the light-transmitting resin plate and the polarized-light scattering plate may be laminated with the interposition of a sheet having a roughened structure formed as a light path. Further, the light-transmitting resin plate and the polarized-light scattering plate may be laminated with the interposition of a roughened structure which has been patternwise coated through a mask onto one or both surfaces of the light-transmitting resin plate or polarized-light scattering plate. Accordingly, the light path may be formed integrally with the light-transmitting resin plate or polarized-light scattering plate or separately of the light-transmitting resin plate or polarized-light scattering plate.

The light path may be in a proper form such that the light-transmitting resin plate and the polarized-light scattering plate can be partially connected to each other, e.g., dotted form or striped form. From the standpoint of controllability over the amount of incident light by contact with the light-transmitting resin plate or polarized-light scattering plate, the light path is preferably formed flat on the contact surface thereof.

Figure 7:
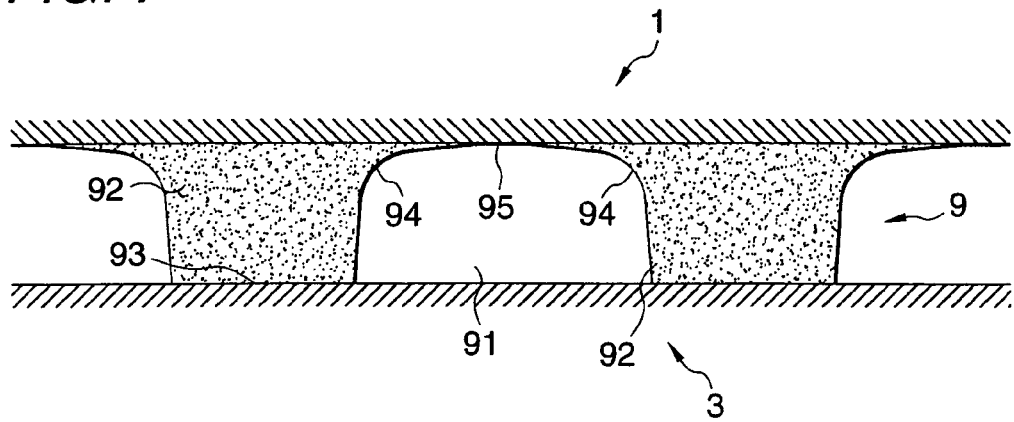
FIG. 7 is a diagram illustrating the sectional shape of the light path.

In the case where the light path is provided as convex portion constituting the roughened structure on the surface of the light-transmitting resin plate or polarized-light scattering plate, it preferably has a roughened structure having a rectangular section as shown in FIG. 7 from the standpoint of adhesion of the convex portion and total reflection by the concave portion between the convex portions. In some detail, the concave portion 91 and the convex portion 92 (light path 9) have flat surfaces 93 and 95. Accordingly, the area at which the light-transmitting resin plate and the polarized-light scattering plate are not in close contact with the light path preferably has a flat surface from the standpoint of total reflection.

The foregoing flat surface may have a finely roughened structure developed by roughening. However, the flat surface is preferably as smooth as possible from the standpoint of total reflection or close contact. In particular, the flat surface as contact surface in the light path is preferably arranged flat so as to be kept in close contact with the light-transmitting resin plate or polarized-light scattering plate.

Further, the light-transmitting resin plate side of the light path made of the concave portion 91 as shown in FIG. 7 preferably has a section having a continuous primary differential curve and a corner portion 94 having an easy curve. If the corner portion on the light-transmitting resin plate side of the light path has a sharp angle, it can cause the generation of bright point and bright line.

The disposition of the light path can be properly determined by the desired amount of incident light to be received by the polarized-light scattering plate. In the present invention, when a light source is disposed at the side face of the light pipe to form a planar polarized-light source, there normally shows a tendency that the brightness increases toward the light source. In order to uniformalize the brightness of the entire emission surface of the light pipe, the arrangement is preferably such that there is a variation of distribution density of light path, particularly such that the distribution density of light path per area of plane increases with distance from the light source. The distribution density of light path may vary stepwise or continuously.

The length of the light path as the difference in height between the concave portion and the convex portion in the roughened structure, i.e., the thickness of the gap between the light-transmitting resin plate and the polarized-light scattering plate at the position where there is no light path is preferably small from the standpoint of reduction of the thickness of the light pipe. When the thickness of the gap is great, light leaks more through this portion to make a pool of light, lowering the percent utilization of light. In order to prevent the reduction of percent utilization of light and secure a gap greater than the wavelength of the transmitted light, thereby obtaining the foregoing total reflection efficiency, the length of the light path is preferably from 0.5 to 1,000 μm, more preferably 500 μm or less, particularly from 1 to 100 μm.

The partial contact of the light-transmitting resin plate with the polarized-light scattering plate through the light path is preferably accomplished by bonding the two components at their interface to inhibit reflection by the interface as much as possible and hence facilitate the transmission of light by the light path from the light-transmitting resin plate to the polarized-light scattering plate. The bonding is advantageous from the standpoint of prevention of deviation of axis.

For the bonding, any proper adhesive such as tacky adhesive, hot-melt adhesive, ultraviolet-curing adhesive and thermosetting adhesive may be used as in the case of the foregoing lamination type polarized-light scattering plate. An adhesive material having an excellent transparency and a refractive index as close to that of these components as possible is preferably used. In this case, as shown in FIG. 6, such an adhesive may be used to form the light path 9 with which the light-transmitting resin plate 1 and the polarized-light scattering plate 3 are bonded to each other.

For the formation of the planar polarized-light source, one or more proper optical layers may be disposed at any proper position. The optical layer is not specifically limited. For example, any proper optical layer such as polarizing plate, retarder plate and liquid crystal cell used in the formation of liquid crystal display device may be used. In this case, the foregoing lens sheet and light diffusion layer may be kept in close contact with the upper optical layer with an adhesive layer or the like interposed therebetween. In the case of lens sheet having a roughened structure or roughened surface type light diffusion layer, however, the arrangement is preferably such that the foregoing gap is provided.

The various layers constituting the light pipe or planar polarized-light source each may comprise an ultraviolet absorber such as salicylic acid ester-based compound, benzophenol-based compound, benzotriazole-based compound, cyano acrylate-based compound and nickel complex-based compound incorporated therein to have an ultraviolet-absorbing capability as necessary.

As mentioned above, the light pipe and planar polarized-light source according to the present invention can provide linearly polarized light with its oscillation plane (polarization axis) being properly controlled and thus can be used for proper devices and purposes utilizing linearly polarized light as in the formation of liquid crystal display device by making the use of its advantages.

EXAMPLE 1

A 20 wt-% dichloromethane solution of 200 parts (hereinafter by weight) of an AS resin (Stylak AS, produced by ASAHI CHEMICAL INDUSTRY CO., LTD.) and 800 parts of a polycarbonate (Panlite, produced by TEIJIN LTD.) was subjected to casting to form a polymer film having a thickness of 80 μm which was then stretched at a temperature of 80° C and a draw ratio of 2.5 and rapidly cooled to obtain a polarized-light scattering plate.

The foregoing polarized-light scattering plate comprised fine domains made of AS resin dispersed in a film made of polycarbonate in domain pattern and exhibited refractive index differences $\Delta n1$ of 0.05, $\Delta n2$ of 0.001 and $\Delta n3$ of 0.001. The average diameter of the foregoing fine domains was measured by coloring based on phase difference under polarization microscope. As a result, the length in $\Delta n1$ direction was about 8 μm.

Subsequently, the foregoing polarized-light scattering plate was bonded to one surface of an acrylic resin plate (produced by Mitsubishi Rayon Co., Ltd.) in such an arrangement that its $\Delta n1$ direction crossed the side face at an angle of 45 degrees to obtain a light pipe. A cold cathode ray tube was then fixed to one side face of the light pipe with a lamp reflector made of a matted PET-based reflection sheet. A specular reflection sheet comprising a PET sheet having silver vacuum-evaporated thereon was disposed on the lower surface of the polarized-light scattering plate to obtain a planar polarized-light source.

COMPARATIVE EXAMPLE 1

A planar light source was obtained in the same manner as in Example 1 except that there was used a light pipe obtained by printing a reflective ink comprising titanium white incorporated therein on one surface of an acrylic resin plate having a thickness of 2 mm in a dotted pattern and then disposing a white reflecting plate made of a foamed PET on the same surface of the acrylic resin plate.

EVALUATION TEST 1

The planar (polarized-)light sources obtained in Example 1 and Comparative Example 1 were each visually observed for brightness in the forward direction and in oblique directions. As a result, the two light sources exhibited almost the same brightness in the forward direction. However, the planar polarized-light source of Example 1 exhibited an excellent brightness over a wider angle range than Comparative Example 1 when observed obliquely.

On the other hand, a polarizing plate having a transmission axis in the direction of 45 degrees was disposed on the planar (polarized-)light source. The planar (polarized-)light source was then measured for brightness in the same manner as mentioned above. As a result, the light source of Comparative Example 1 showed an approximately halved brightness due to the disposition of the polarizing plate while the planar polarized-light source of Example 1 showed little brightness drop and thus exhibited a brightness approximately double that of Comparative Example 1.

EXAMPLE 2

A 20 wt-% dichloromethane solution of 950 parts of a norbornene-based resin having a deflection temperature of 165° C. and a glass transition temperature of 182° C. (Arton, produced by JSR Inc.) and 50 parts of a liquid crystal polymer represented by the following general formula having a glass transition temperature of 80° C. and a nematic liquid-crystallization temperature of from 100° C. to 290° C. was subjected to casting to form a polymer film having a thickness of 100 μm which was then stretched at a temperature of 180° C. and a draw ratio of 3 and rapidly cooled to obtain a polarized-light scattering plate.

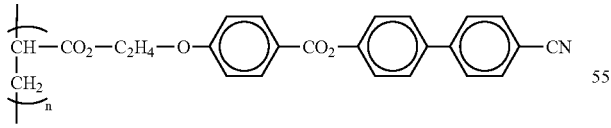

The foregoing polarized-light scattering plate comprised a liquid crystal polymer dispersed in a transparent film made of norbornene-based resin in a pattern of domains having almost the same shape which are longitudinal in the stretching direction and exhibited refractive index differences $\Delta n1$ of 0.23, $\Delta n2$ of 0.029 and $\Delta n3$ of 0.029. The average diameter of the foregoing fine domains was measured by coloring based on phase difference under polarization microscope. As a result, the length in $\Delta n1$ direction was about 5 μm.

Subsequently, the foregoing polarized-light scattering plate was bonded to one surface of an acrylic resin plate (produced by Mitsubishi Rayon Co., Ltd.) in such an arrangement that its $\Delta n1$ direction crossed the side face at an angle of 45 degrees to obtain a light pipe. A cold cathode ray tube was then fixed to one side face of the light pipe with a lamp reflector made of a matted PET-based reflection sheet. A specular reflection sheet comprising a PET sheet having silver vacuum-evaporated thereon was disposed on the lower surface of the polarized-light scattering plate to obtain a planar polarized-light source.

COMPARATIVE EXAMPLE 2

A planar light source was obtained in the same manner as in Example 2 except that there was used a light pipe obtained by printing a reflective ink comprising titanium white incorporated therein on one surface of an acrylic resin plate having a thickness of 2 mm in a dotted pattern and then disposing a white reflecting plate made of a foamed PET on the same surface of the acrylic resin plate.

EVALUATION TEST 2

The planar (polarized-)light sources obtained in Example 2 and Comparative Example 2 were each visually observed for brightness in the forward direction and in oblique directions. As a result, the two light sources exhibited almost the same brightness in the forward direction. However, the planar polarized-light source of Example 2 exhibited an excellent brightness over a wider angle range than Comparative Example 2 when observed obliquely.

On the other hand, a polarizing plate having a transmission axis in the direction of 45 degrees was disposed on the planar (polarized-)light source. The planar (polarized-)light source was then measured for brightness in the same manner as mentioned above. As a result, the light source of Comparative Example 2 showed an approximately halved brightness due to the disposition of the polarizing plate while the planar polarized-light source of Example 2 showed little brightness drop and thus exhibited a brightness approximately double that of Comparative Example 2. The planar polarized-light source of Example 2 was allowed to stand in a 80° C. atmosphere for 100 hours, and then operated again. As a result, the planar polarized-light source of Example 2 showed no brightness drop.

As obvious from the foregoing description, when the planar polarized-light source according to the present invention is used as a backlight for liquid crystal display device, a very bright display can be realized. Further, the planar polarized-light source according to the present invention exhibits an excellent thermal stability and thus can retain its function over an extended period of time.

EXAMPLE 3

A 20 wt-% dichloromethane solution of 950 parts of a norbornene-based resin having a glass transition temperature of 182° C. (Arton, produced by JSR Inc.) and 50 parts of a liquid crystal polymer represented by the same general formula as in Example 2 was subjected to casting to form a polymer film having a thickness of 100 μm which was then stretched at a temperature of 180° C. and a draw ratio of 3 and rapidly cooled to obtain a polarized-light scattering plate. The polarized-light scattering plate thus obtained exhibited the same refractive index differences $\Delta n1$, $\Delta n2$ and $\Delta n3$ and average minute region diameter as in Example 2.

Subsequently, the foregoing polarized-light scattering plate was bonded to one surface of an acrylic resin plate (produced by Mitsubishi Rayon Co., Ltd.) in such an arrangement that its Δn1 direction crossed the side face at an angle of 45 degrees to obtain a laminate. A specular reflection sheet comprising a PET sheet having silver vacuum-evaporated thereon was then disposed on the lower surface of the laminate. At the same time, a light diffusion plate was disposed on the upper surface of the laminate to obtain a light pipe. A cold cathode ray tube was then fixed to one side face of the light pipe with a lamp reflector made of a matted PET-based reflection sheet.

The foregoing light diffusion plate had been obtained by a process which comprises adding 30 parts of silicone particles having an average diameter of 4 μm to 70 parts of an ultraviolet-curing epoxy resin, stirring the mixture to cause defoaming, applying the material to one surface of a 80 μm thick cellulose triacetate film to a thickness of 30 μm, and then irradiating the coated material with light from a high voltage mercury vapor lamp at an accumulated dose of 1,000 mJ/cm$^2$ so that it was cured. In the light diffusion plate, the ratio of refractive index of silicone particles to cured epoxy resin was 0.95. The amount of light leaked due to elimination of polarization in an arrangement comprising the light diffusion plate interposed between polarizers of cross nicol was 0.7% of the total amount of incident light.

EXAMPLE 4

A light pipe and a planar polarized-light source were obtained in the same manner as in Example 3 except that as the light diffusion plate there was used one having a finely roughened surface structure obtained by a process which comprises stirring 10 parts of silica particles having an average diameter of 1.8 μm, 100 parts of an ultraviolet-curing acrylurethane-based oligomer and 3 parts of benzophenone with ethylene acetate at a high speed to obtain a dispersion having a solid content of 50% by weight, applying the dispersion to one surface of a cellulose triacetate film having a thickness of 80 μm, drying the coated material so that the thickness of the coating film reached 4 μm, and then irradiating the coated material with light from a high voltage mercury vapor lamp at an accumulated dose of 150 mJ/cm$^2$ so that it was cured.

The light diffusion plate showed a silica particle to cured resin refractive index ratio of 0.93. The amount of light leaked due to elimination of polarization was 1.0% of the total amount of incident light. The light diffusion plate exhibited a surface roughness Ra (value averaged over 10 points according to JIS B 0601) of 1.5 μm as determined by a surface roughness meter.

COMPARATIVE EXAMPLE 3

A planar light source was obtained in the same manner as in Example 3 except that there was used a light pipe obtained by printing a reflective ink comprising titanium white incorporated therein on one surface of an acrylic resin plate having a thickness of 2 mm in a dotted pattern and then disposing a white reflecting plate made of a foamed PET on the same surface of the acrylic resin plate.

COMPARATIVE EXAMPLE 4

A light pipe and a planar polarized-light source were obtained in the same manner as in Example 4 except that there was used a light diffusion plate comprising a polyester film instead of cellulose triacetate film and hence allowing leakage of light due to elimination of polarization in an amount of 5.2% of the total amount of incident light.

COMPARATIVE EXAMPLE 5

A light pipe and a planar polarized-light source were obtained in the same manner as in Example 3 except that there was disposed no light diffusion plate.

EVALUATION TEST 3

The planar (polarized-)light sources obtained in Examples 3 and 4 and Comparative Examples 3 to 5 were each measured for brightness on the central portion thereof in the forward direction and uniformity in brightness on the plane by means of a brightness meter (BM-7, produced by TOPCON CORP.). The proportion of these measurements based on Comparative Example 1 was determined. The results are set forth in the table below. The figure in parentheses each indicate the proportion of brightness determined when the polarizing plate is disposed on the planar light source in such an arrangement that the transmission axis lies at an angle of 45 degrees based on Comparative Example 1.

|  | Front brightness (polarizing plate disposed) | Uniformity |
| --- | --- | --- |
| Example 3 | 110 (100) | Good |
| Example 4 | 90 (80) | Good |
| Comparative Example 3 | 100 (40) | Good |
| Comparative Example 4 | 90 (50) | Good |
| Comparative Example 5 | 60 (50) | Poor |

The comparison with Comparative Example 5 in the table below shows that the disposition of the light diffusion plate makes it possible to drastically enhance the front brightness as well as the uniformity in brightness on the plane. The comparison of the examples with Comparative Example 3 shows that the examples emit linearly polarized light and exhibit a drastically enhanced brightness through the polarizing plate. The comparison of the examples with Comparative Example 4 shows that if the light diffusion plate eliminates polarization, the advantage of emitting linearly polarized light cannot be made the use of. It is thus made obvious that when the planar polarized-light source according to the present invention is used as a backlight for liquid crystal display device, a brightness twice or more times ordinary value (Comparative Example 3) can be realized, making it possible to accomplish a very bright display excellent in uniformity.

EXAMPLE 5

A laminate (light pipe) was obtained by laminating a polarized-light scattering plate obtained in the same manner as in Example 3 with the same acrylic resin plate as used in Examples 1 and 3 in the same manner as in Examples 1 and 3. A specular reflection sheet comprising a PET sheet having silver vacuum-evaporated thereon was then disposed on the lower surface of the laminate. At the same time, a light diffusion plate was disposed on the upper surface of the laminate to obtain a light pipe. A cold cathode ray tube was then fixed to one side face of the light pipe with a lamp reflector made of a matted PET-based reflection sheet.

The foregoing lens sheet had been obtained by providing on one surface of a cellulose triacetate resin film having a thickness of 80 μm a lens form having a striped alignment of linear protrusions made of a photosetting epoxy resin having a triangular section with a vertical angle of 90 degrees and a height of 80 μm arranged at an interval of 350 μm. The arrangement was such that the lens form lies at the upper side and the direction of stripes is parallel to the foregoing Δn2 direction. The lens sheet thus obtained exhibits a transmittance (hereinafter the amount of light leaked due to elimination of polarization) of 1.0% of the total amount of incident light as determined by an integrating sphere when disposed between cross nicols and thus is excellent in polarization-retaining properties.

EXAMPLE 6

A light pipe and a planar polarized-light source were obtained in the same manner as in Example 1 except that a light diffusion plate obtained by a process which comprises adding 30 parts of silicone particles having an average diameter of 4 μm to 70 parts of an ultraviolet-curing epoxy resin, stirring the mixture to cause defoaming, applying the material to one surface of a 80 μm thick cellulose triacetate film to a thickness of 30 μm, and then irradiating the coated material with light from a high voltage mercury vapor lamp at an accumulated dose of 1,000 mJ/cm$^2$ so that it was cured was disposed between the laminate and the lens sheet. The foregoing light diffusion plate allowed leakage of light due to elimination of polarization in an amount of 0.7% of the total amount of incident light.

COMPARATIVE EXAMPLE 6

A planar light source was obtained in the same manner as in Example 5 except that there was used a light pipe obtained by printing a reflective ink comprising titanium white incorporated therein on one surface of an acrylic resin plate having a thickness of 2 mm in a dotted pattern and then disposing a white reflecting plate made of a foamed PET on the same surface of the acrylic resin plate.

COMPARATIVE EXAMPLE 7

A light pipe and a planar polarized-light source were obtained in the same manner as in Example 5 except that there was used a lens sheet comprising a polyester film instead of cellulose triacetate film and hence allowing leakage of light due to elimination of polarization in an amount of 6.2% of the total amount of incident light.

EVALUATION TEST 4

The planar (polarized-)light sources obtained in Examples 5 and 6 and Comparative Examples 6 and 7 were each measured for brightness on the central portion thereof in the forward direction and brightness in the forward direction with a commercially available absorption type polarizing plate having a transmittance of 44% and a polarization degree of 99% being disposed on the planar light source in such an arrangement that the transmission axis lies at an angle of 45 degrees by means of a brightness meter (BM-7, produced by TOPCON CORP.). The proportion of these measurements based on Comparative Example 6, which was free of polarizing plate, was determined. The results are set forth in the table below.

|  | Front brightness | |
| --- | --- | --- |
|  | With no polarizing plate disposed | With polarizing plate disposed |
| Example 5 | 95 | 76 |
| Example 6 | 98 | 77 |
| Comparative Example 6 | 100 | 44 |
| Comparative Example 7 | 95 | 48 |

The results in the table above shows that the examples can emit linearly polarized light and exhibits a drastically enhanced brightness through the polarizing plate. Further, the comparison of the examples with Comparative Example 7 shows that if the light diffusion plate eliminates polarization, the advantage of emitting linearly polarized light cannot be made the use of. It is thus made obvious that when the planar polarized-light source according to the present invention is used as a backlight for liquid crystal display device, a brightness 1.5 or more times ordinary value (Comparative Example 1) can be realized, making it possible to accomplish a very bright display. In Example 6, which comprised a light diffusion plate incorporated therein, the vision of linear pattern on the lens sheet was relaxed, enhancing visibility.

EXAMPLE 7

The same polarized-light scattering plate as obtained in Example 3 was bonded to one surface of a commercially available polycarbonate plate having a thickness of 2 mm with an acrylic adhesive layer in such an arrangement that its Δn1 direction crossed the side face at an angle of 45 degrees to obtain a laminate. A specular reflection sheet comprising a PET sheet having silver vacuum-evaporated thereon was disposed on the lower surface of the laminate to obtain a light pipe. A cold cathode ray tube was then fixed to one side face of the laminate with a lamp reflector made of a matted PET-based reflection sheet. The average phase difference in the plane of the foregoing polycarbonate plate was 80 nm, and the average retardation axis was parallel to its side face (0 degree direction).

COMPARATIVE EXAMPLE 8

A planar light source was obtained in the same manner as in Example 7 except that there was used a light pipe obtained by printing a reflective ink comprising titanium white incorporated therein on one surface of an acrylic resin plate having a thickness of 2 mm in a dotted pattern and then disposing a white reflecting plate made of a foamed PET on the same surface of the acrylic resin plate.

COMPARATIVE EXAMPLE 9

A light pipe and a planar polarized-light source were obtained in the same manner as in Example 7 except that an acrylic resin plate (in-plane average phase difference: 5 nm or less) was used instead of the polycarbonate plate.

EVALUATION TEST 5

A commercially available absorption type polarizing plate was disposed on the planar (polarized-)light sources obtained in Example 7 and Comparative Examples 8 and 9 in such an arrangement that the transmission axis lies at an angle of 45 degrees. These arrangements were each visually measured for brightness in the forward direction. As a result, brightness decreased in the order of Example 1, Comparative Example 9 and Comparative Example 8. The difference in brightness was definitely viewed also visually. The difference in brightness between Comparative Example 9 and Comparative Example 8 was obviously greater than that between Example 7 and Comparative Example 9.

As can be seen in the foregoing description, when there is disposed no polarizing plate, the brightness of Example 7 and Comparative Examples 8 and 9 in the forward direction as viewed visually are almost the same and thus can be hardly distinguished. It can be seen that the difference in brightness between Example 7 and Comparative Example 8 in the arrangement having a polarizing plate makes it possible to drastically enhance brightness of linearly polarized light through the polarizing plate in Example 7. As mentioned above, when the planar polarized-light source according to the present invention is used as a backlight for liquid crystal display device, the brightness can be drastically enhanced, making it possible to accomplish a very bright display.

EXAMPLE 8

A toluene solution of a hot-melt resin (Evaflex, produced by Du Pont) was applied to one surface of the same polarized-light scattering plate as obtained in Example 3 through a mask pattern having many through-holes having a diameter of 1 mm formed therein, and then dried to form a light path having a height of 10 μm which is sparse on the light source side thereof and dense on the opposing side thereof.

The foregoing polarized-light scattering plate was then hot-pressed onto one surface of an acrylic resin plate having a thickness of 2 mm (produced by Mitsubishi Rayon Co., Ltd.) with the light path interposed therebetween in such an arrangement that its Δn1 direction crossed the side face thereof where the light source is disposed at an angle of 45 degrees to obtain a light pipe. A specular reflection sheet comprising a PET sheet having silver vacuum-evaporated thereon was disposed on the lower surface of the light pipe. At the same time, a cold cathode ray tube was then fixed to one side face of the light pipe with a lamp reflector made of a matted PET-based reflection sheet to obtain a planar polarized-light source.

COMPARATIVE EXAMPLE 10

A planar light source was obtained in the same manner as in Example 8 except that there was used a light pipe obtained by printing a reflective ink comprising titanium white incorporated therein on one surface of an acrylic resin plate having a thickness of 2 mm in a dotted pattern and then disposing a white reflecting plate made of a foamed PET on the same surface of the acrylic resin plate.

COMPARATIVE EXAMPLE 11

A light pipe and a planar polarized-light source were obtained in the same manner as in Example 8 except that a hot-melt adhesive was applied to the entire one surface of the polarized-light scattering plate and the polarized-light scattering plate was then entirely bonded to the acrylic resin plate with the hot-melt adhesive layer interposed therebetween.

EVALUATION TEST 6

A commercially available absorption type polarizing plate having a transmittance of 44% and a polarization degree of 99% was disposed on the planar (polarized-)light sources obtained in Example 8 and Comparative Examples 10 and 11 in such an arrangement that the transmission axis lies at an angle of 45 degrees. These arrangements were each visually measured for brightness. As a result, the comparison with Comparative Example 10 shows that Example 8 and Comparative Example 11 show a drastically brightness through the polarizing plate and thus can emit linearly polarized light from the planar source.

On the other hand, Comparative Example 11 is brighter toward the light source and less bright with distance from the light source, showing a great variation of brightness. However, Example 8 shows no visual difference in brightness on the entire surface thereof and thus is excellent in uniformity in brightness. As mentioned above, when the planar polarized-light source according to the present invention is used as a backlight for liquid crystal display device, the percent utilization of light can be drastically enhanced, making it possible to accomplish a bright display having an excellent uniformity in brightness and a good visibility.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A light pipe comprising:
   a laminate having a birefringent light-transmitting resin plate, and a polarized-light scattering plate laminated on at least one surface of said light-transmitting resin plate, said polarized-light scattering plate having fine birefringent domains dispersed therein to exhibit anisotropy in scattering depending on a polarization direction; and
   a specular reflection layer provided on a surface of said laminate, such that said specular reflection layer is on a side of said laminate which is opposite said birefringent light-transmitting resin plate,
   wherein said polarized-light scattering plate is positioned between said light-transmitting resin plate and said specular reflection layer,
   said light-transmitting resin plate and said polarized-light scattering plate do not contact each other, and
   a phase difference due to birefringence of the light-transmitting resin plate is 50 nm or more based on an average phase difference in a plane of said light-transmitted resin plate.

2. A light pipe according to claim 1, wherein a retardation axis of the light-transmitting resin plate and a light axis of the polarized-light scattering plate in the laminate cross each other at an angle of 5 degrees or more.

3. A polarized-light source comprising: a light pipe according to claim 1; and a light source disposed at least on one side face of said light pipe.

4. A light pipe according to claim 1, wherein said polarized-light scattering plate is disposed outside of said birefringent light-transmitting resin plate.

5. A light pipe according to claim 4, wherein said polarized-light scattering plate is separated from said birefringent light-transmitting resin plate by a layer of adhesive.

6. A light pipe according to claim 1, wherein said polarized-light scattering plate is a continuous plate that extends along the entire length of said birefringent light-transmitting resin plate.

7. A light pipe according to claim 1, further including a light source, a portion of said light source being aligned along a longitudinal direction of said polarized-light scattering plate.

8. A light pipe according to claim 7, wherein a portion of said light source is aligned along a longitudinal direction of said birefringent light-transmitting resin plate.

9. A light pipe according to claim 8, further including a reflector, wherein said reflector is extended in a longitudinal direction of said birefringent light-transmitting resin plate and said polarized-light scattering plate.

10. A light pipe according to claim 1, wherein no open gap exists between said birefringent light-transmitting resin plate and said polarized-light scattering plate.

11. A light pipe according to claim 1, wherein said polarized-light scattering plate is disposed on an outside surface of said birefringent light-transmitting resin plate.

* * * * *